Aug. 4, 1936.    G. R. WHITNALL    2,050,144
CONVEYER TURN CONSTRUCTION
Filed July 8, 1935    2 Sheets-Sheet 1

Inventor
G. R. Whitnall
By Frease and Bishop
Attorneys

Aug. 4, 1936.                G. R. WHITNALL                2,050,144
                        CONVEYER TURN CONSTRUCTION
                    Filed July 8, 1935            2 Sheets-Sheet 2

Inventor
G. R. Whitnall
By Frease and Bishop
Attorneys

Patented Aug. 4, 1936

2,050,144

UNITED STATES PATENT OFFICE 2,050,144

CONVEYER TURN CONSTRUCTION

George R. Whitnall, New Philadelphia, Ohio, assignor to La-Del Conveyor & Mfg. Co., New Philadelphia, Ohio, a corporation of Ohio Application July 8, 1935, Serial No. 30,267

6 Claims. (Cl. 198—220)

The invention relates to shaking or reciprocating conveyers, and more particularly to a unitary corner or turn construction for use at angles or corners of shaking conveyers.

Certain prior conveyer turns have provided a corner pan pivotally connected at its ends to line conveyers forming an angle with each other, the corner pan being secured to a frame having a laterally spaced pivotal mounting, so that the reciprocating motion of one line conveyer is transmitted through the corner pan to the other line conveyer.

With this prior type of construction, the reciprocation of the driven line conveyer imparts a reciprocating movement to the corner pan in the path of an arc described about the pivotal mounting of the pan supporting frame, which arcuate movement tends to cause the adjacent ends of the line conveyers to swing laterally during the reciprocating movement.

This lateral movement in the line conveyers ahead and back of the corner pan detracts materially from the longitudinal conveying action, and puts a severe strain on the connections between the troughs of the line conveyers, causing distortion or breakage thereof. Also, such lateral movement upsets or otherwise damages the rollers or supporting carriages upon which the line conveyer troughs are carried.

Moreover, the lateral movement of the line conveyers causes severe strains and bending moments in the corner pan itself, as well as in the pivotal mounting therefor, resulting in bending and warping of the corner pan, and requiring increased driving power.

It is therefore an object of the present invention to provide an improved turn construction for a shaking conveyer in which the motion of the adjacent ends of the line conveyers is controlled and positively restrained against lateral movement.

Another object is to provide a conveyer turn construction in which the corner pan acts primarily as a conveying receptacle and not as a means for transmitting motion from one line conveyer to the other.

Another object is to provide a turn construction having a crank arm connected directly to the adjacent ends of the line conveyers for controlling and transmitting the reciprocating motion thereof.

A further object is to provide a unitary turn construction designed to support the corner pan and end troughs connected thereto without requiring any auxiliary supports.

A still further object is to provide a conveyer turn construction having a base providing anchoring points on opposite sides of the corner pan.

And finally, it is an object of the present invention to incorporate all of the foregoing advantages in a strong and durable structure which may be quickly connected to and disconnected from line conveyers in common everyday use, and which may be moved from place to place with comparative ease.

These and other objects are attained by the improved construction comprising the present invention which is hereinafter described in detail and defined in the appended claims.

In general terms, the present invention includes the provision of a bell crank pivotally supported on a wide base, the arms of the bell crank being connected directly to and supporting the adjacent end troughs of two line conveyers, and a corner conveyer pan connecting the end troughs.

In the drawings forming part hereof

Similar numerals refer to similar parts throughout the drawings.

Figure 1:
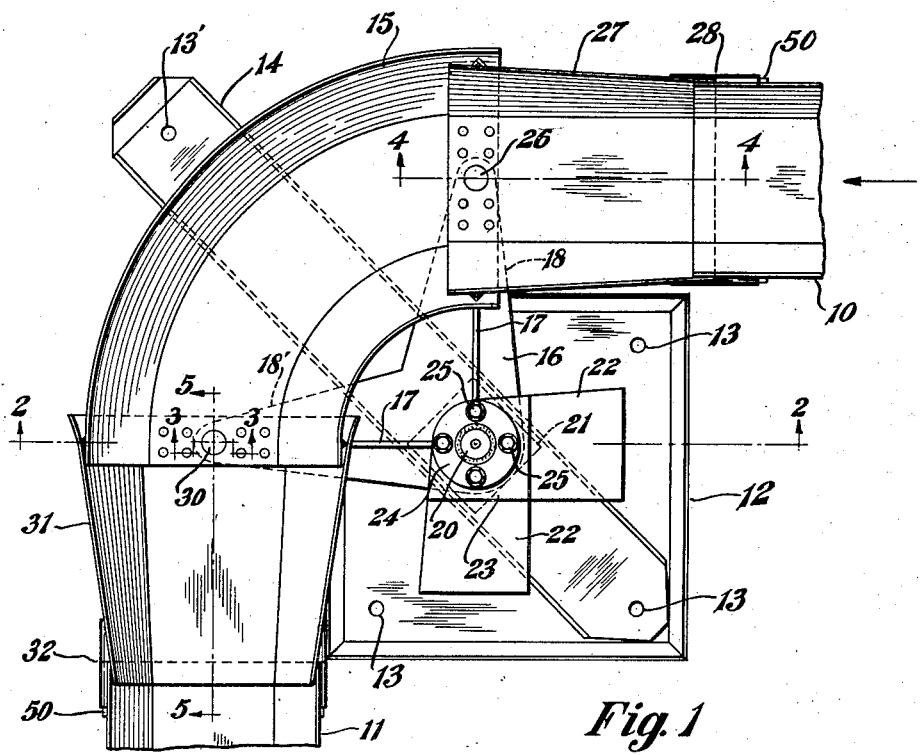
Figure 1 is a plan view of the improved conveyer turn construction forming a right angle turn between two line conveyers.

In the drawings the delivery end of a driven line conveyer is shown fragmentarily at 10, and the receiving end of another line conveyer at right angles to the line conveyer 10 is shown fragmentarily at 11, the forward movement of the material being conveyed being indicated by the arrow in Fig. 1.

The improved unitary turn construction preferably includes a base 12 for resting on the floor of a mine and the like, and at the inner side of the angle between the conveyers, the base may be rectangular as shown and provided with spaced depressions or holes indicated at 13 for receiving jacks to support the base from the ceiling of the mine in a well known manner.

A channel member 14 is secured to and extends diagonally across the rectangular portion of the base, being adapted to project outwardly beyond the outer or opposite side of the corner conveyer pan 15. The outer end of the channel member 14 is preferably provided with a hole or depression 13' for receiving another supporting jack, so that the base is securely supported at four spaced points on opposite sides of the corner pan.

A rigid bell crank lever 10 is pivotally mounted on the base 12, preferably on the channel 14 which is secured to the base.

The bell crank 16 may be provided with a strengthening rib 17 on each of its arms 18 and 18', and has at the corner or apex of the arms a tubular portion 19 journalled on a king pin 20, which is rigidly secured in the base 12. Preferably, the bottom of the king pin 20 passes through the channel 14 and through a heavy plate 21 secured thereon, and the plate 21 provides a bearing surface for the bottom of the tubular portion 19 of the bell crank.

Preferably, bracket arms 22 project upwardly and inwardly from the top of the base, to provide overlapping portions 23 through which the upper portion of the king pin extends. A cover plate 24 may be positioned on top of the portions 23, the plate 24 and overlapping portions being secured together by means of bolts 25, and the king pin is secured to cover plate 24, as by welding.

Figure 4:
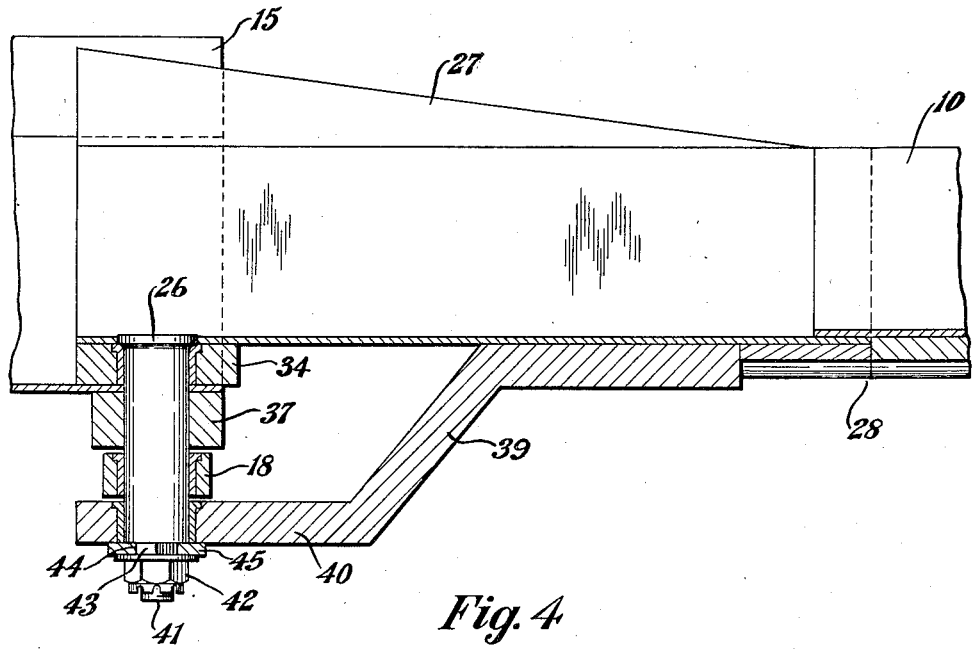
Fig. 4 is an enlarged fragmentary longitudinal section as on line 4—4, Fig. 1.
Figure 5:
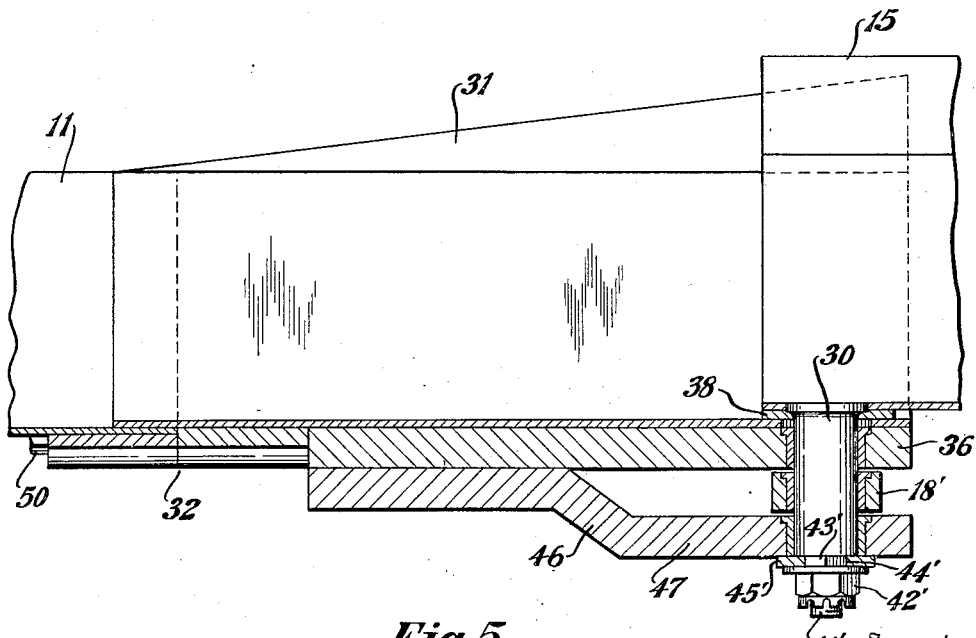
Fig. 5 is an enlarged fragmentary longitudinal section as on line 5—5, Fig. 1.

A pivot pin 26 is journalled in the outer end of the bell crank arm 18, as best shown in Fig. 4, and the upper end of the pin 26 is pivotally connected to the delivery end of the end trough 27, which is rigidly secured at its other end to the delivery end of the line conveyer 10, by connecting means indicated generally at 28.

A pivot pin 30 is journalled in the outer end of crank arm 18', and the receiving end of end trough 31 is pivotally connected to the upper end of pivot pin 30, the delivery end of trough 31 being connected to line conveyer 11 by connecting means indicated generally at 32.

Preferably, the delivery end of end trough 27 has secured to its underside a bar 34 in which the pivot pin 26 is journalled, and likewise the receiving end of trough 31 has secured to its underside a bar 36 in which the pivot pin 30 is journalled.

Figure 3:
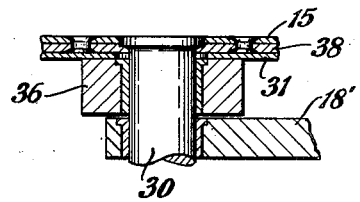
Fig. 3 is an enlarged fragmentary section thereof taken on line 3—3, Fig. 1.
Figure 2:
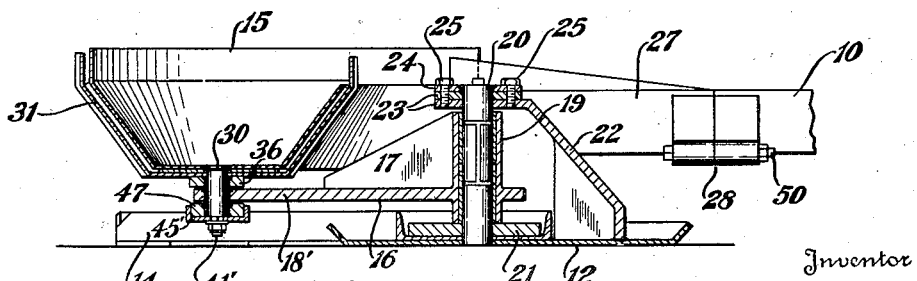
Fig. 2 is a transverse sectional view thereof as on line 2—2, Fig. 1.

The receiving end of corner pan 15 is located under but not secured to bar 34, and the delivery end of pan 15 is located on top of end trough 31 but not secured thereto, as best shown in Fig. 3. Preferably, the receiving end of corner pan 15 has secured on its underside a spacer bar 37 for spacing the corner pan from the crank arm 18, and the delivery end of the corner pan has a plate 38 secured to its underside for riding on the end trough 31.

An angle supporting bar 39 is secured to the underside of end trough 27 and extends downwardly and forwardly to form a horizontal portion 40 having a journal for the lower end of the pivot pin 26 below the crank arm 18, the pivot pin having a reduced threaded lower end 41 on which a lock nut 42 is screwed, and being provided with a squared portion 43 which is received in the square hole 44 of a U-shaped bracket 45 which is clamped around the portion 40 of the bar by the nut 42, thus preventing the pivot pin from turning in the bar 39.

Similarly, an angle supporting bar 46 is secured to the bar 36 on the underside of end trough 31, and extends downwardly and rearwardly to form a horizontal portion 47 having a journal for the lower end of pivot pin 30 below the crank arm 18', the pivot pin having a reduced threaded end 41' on which a lock nut 42' is screwed, and being provided with a squared portion 43' which is received in the square hole 44' of a U-shaped bracket 45' which is clamped around the portion 47 of the bar by the nut 42', thus preventing the pivot pin from turning in the bar 46.

The pivot pin 26 extends through the receiving end of the corner pan 15 and the bar 37 secured thereto, to form a pivotal connection between the corner pan and end trough 27, and the pivot pin 30 extends through the delivery end of the corner pan 15 and the bearing plate 38 secured thereto to form a pivotal connection between the corner pan and the end trough 31.

Thus, the base 12, bell crank 16, corner pan 15, and end troughs 27 and 31 form a unitary conveyer turn construction which may be easily disconnected from or connected to the line conveyers 10 and 11 by merely removing the bolts 50 of the connection means 28 and 32, so that the whole structure may be moved from place to place by merely removing the supporting jacks which abut the base at points 13 and 13'.

When the end troughs are connected to the line conveyers, the end troughs and the corner pan 15 are supported on the base 12, and the base provides spaced points at opposite sides of the corner pan for engaging jacks, so that the whole turn structure is solidly supported without the use of auxiliary supports, such as wheels.

Due to the fact that the end troughs 27 and 31 are pivotally connected directly to and supported by the arms of the bell crank, the reciprocating motion of the driven conveyer 10 is transmitted to line conveyer 11 through the bell crank, thus minimizing the stress and strain to which the corner pan is subjected, and the corner pan acts primarily as a conveying receptacle.

Since the end troughs of the line conveyers are connected directly to the crank arms, the reciprocating motion of the line conveyers is controlled and positively restrained against any substantial lateral movement, with the result that the connections between the troughs of the line conveyers are not subjected to any material distortion or bending.

Obviously, the improved conveyer turn construction can be applied to corners having angles varying from a right angle, without departing from the scope of the invention as defined in the appended claims.

I claim:

1. Conveyer turn construction for a corner between two horizontally reciprocable line conveyers, including a crank having two arms, each arm being pivotally connected directly to the end trough of one of the line conveyers for supporting said end troughs, and a corner pan connecting the end troughs.

2. Conveyer turn construction for a corner between two line conveyers, including a base, a crank member pivotally mounted on the base and having arms, end troughs pivotally connected directly one to each crank arm and adapted for connection to the line conveyers, and a corner pan pivotally connected at its ends to the end troughs.

3. Conveyer turn construction for a corner between two line conveyers, including a base, a crank member pivotally mounted on the base and having arms, end troughs adapted for connection to each line conveyer, each end trough having a pivotal connection with one of the crank arms, and a corner conveyer pan swiveled at its ends on said pivotal connections.

4. Conveyer turn construction for a corner between two line conveyers having adjacent end troughs, including a corner conveyer pan pivotally connected at its ends to the end troughs, a base extending under the corner pan for providing anchor points at opposite sides of said corner pan, and a crank pivotally mounted on the base at one side of the corner pan and supporting said corner pan.

5. Conveyer turn construction for a corner between two line conveyers having adjacent end troughs, including a corner conveyer pan pivotally connected at its ends to the end troughs, a base extending under the corner pan for providing anchor points at opposite sides of said corner pan, and a crank pivotally mounted on the base at one side of the corner pan and having arms pivotally connected directly to said end troughs.

6. Conveyer turn construction including a corner pan pivotally connecting the end troughs of horizontally reciprocable line conveyers, a base under said corner pan, and a bell crank pivotally mounted on said base, each arm of said bell crank being pivotally connected to and supporting one of said end troughs.

GEORGE R. WHITNALL.